United States Patent [19]

Clampitt

[11] 4,104,216

[45] Aug. 1, 1978

[54] COPOLYMERS CONTAINING AN ALPHA-OLEFIN AND AN ALPHA, BETA-ETHYLENICALLY UNSATURATED CARBOXYLIC ACID PLASTICIZED WITH LONG-CHAIN FATTY ACID

[75] Inventor: Bert H. Clampitt, Houston, Tex.

[73] Assignee: Gulf Oil Corporation, Pittsburgh, Pa.

[21] Appl. No.: 774,983

[22] Filed: Mar. 7, 1977

[51] Int. Cl.² .................... C08F 10/00; C08F 210/00
[52] U.S. Cl. ........................ 260/23 AR; 260/23 H; 428/441
[58] Field of Search .................... 260/23 H, 23 AR

[56] References Cited

U.S. PATENT DOCUMENTS

| | | | |
|---|---|---|---|
| 2,084,386 | 6/1937 | Crawford | 260/23 AR |
| 3,361,702 | 1/1968 | Wartman et al. | 260/30.6 R |
| 3,437,718 | 4/1969 | Rees | 260/897 B |
| 3,464,949 | 9/1969 | Wartman et al. | 260/30.6 R |
| 3,504,075 | 3/1970 | Williams et al. | 264/130 |
| 3,557,070 | 1/1971 | Anspon et al. | 526/303 |
| 3,944,511 | 3/1976 | Taylor | 260/23 H |
| 3,970,626 | 7/1976 | Hurst et al. | 260/29.6 WB |

FOREIGN PATENT DOCUMENTS

| | | | |
|---|---|---|---|
| 47-38055 | 9/1972 | Japan | 260/23 H |

*Primary Examiner*—Ronald W. Griffin

[57] ABSTRACT

This invention relates to copolymers containing an alpha-olefin and alpha, beta-ethylenically unsaturated carboxylic acid plasticized with a selected long-chain fatty acid. In a preferred embodiment, ethylene-acrylic acid copolymers, ethylene-methacrylic acid copolymers and their respective salts, i.e. ionomers, are plasticized using a selected long-chain fatty acid. The plasticized copolymers so obtained are generally characterized by having higher melt index, lower glass transition temperature (TG), greater flexibility, lower stiffness, higher resiliency and easier processibility than the corresponding unplasticized copolymers.

22 Claims, No Drawings

COPOLYMERS CONTAINING AN ALPHA-OLEFIN AND AN ALPHA, BETA-ETHYLENICALLY UNSATURATED CARBOXYLIC ACID PLASTICIZED WITH LONG-CHAIN FATTY ACID

BACKGROUND OF THE INVENTION

1. Field of The Invention

The plasticizer technology of today is a hybrid of art and science, formulated and derived from the discoveries by various primitive people. For example, Neat's-foot and sperm oil applied to leather were plasticizers utilized by early artisans. Similarly, the modern plasticizer industry evolved as a result of surface coatings. For example, when a resin used in a varnish left a film that was inelastic and too brittle it was modified with a drying oil or other material which would impart to it the requisite property of toughness by giving it the right amount of plasticity. The term "plasticizer" as used herein is a softner or substance which when incorporated in a material (usually a plastic or elastomer) increases its flexibility, workability or distensibility.

A plasticizer may reduce the melt viscosity, lower the temperature of a second-order transition, or lower the elastic modulus of the material with which it is admixed. Second-order transition temperatures may be determined by plotting any temperature dependent property of a material, such as density or refractive index, against temperature. The transition temperature, which is believed to be identified with the onset of rotational freedom within the material's macromolecules, may be located and determined by a sharp change of curvature. Since plasticization lowers this temperature by reducing interchain barriers against rotation, it follows that a comparison of second-order transition temperatures on polymer plasticized compositions that are equivalent at room temperature affords a means of evaluating the temperature performance of plasticizers.

2. Description of The Prior Art

The plasticization of ethylene-acrylic acid copolymers is old and is described, for example, in U.S. Pat. No. 3,361,702 issued to Wartman et al., on Jan. 2, 1968, entitled Ethylene-Acrylic Acid Copolymers Plasticized With Polyols. In particular, glycols, glycerols and the like are described as suitable for use as melt index, stiffness, processability, glass transition temperature and resiliency improvers when added to ethylene-acrylic acid or ethylene methacrylic acid copolymers. As can readily be determined from the foregoing there is an ongoing search for new and superior plasticizers for various polymers and copolymers. Similarly, in U.S. Pat. No. 3,464,949, also issued to Wartman et al., on Sept. 2, 1969, entitled Ethylene-Acrylic Acid Copolymers Plasticized with Adducts of Alkylene Oxides and Amines, adducts of alkylene oxides and amines are used as plasticizers in said copolymers.

SUMMARY OF THE INVENTION

This invention relates to a composition of matter comprising a copolymer consisting essentially of an alpha-olefin of the formula: $RCH = CH_2$, wherein $R$ is a radical selected from the group of hydrogen and alkyl radicals having from about 1 to about 8 carbon atoms; and an alpha, beta-ethylenically unsaturated carboxylic acid, having from about 3 to about 8 carbon atoms, or the respective copolymer salts, said copolymer having a molecular weight of from about 20,000 to about 200,000, particularly copolymers of ethylene-acrylic acid, ethylene-methacrylic acid and their respective salts, plasticized with a long-chain fatty acid selected from either saturated or unsaturated fatty acids containing 9 to 11 carbon atoms.

DETAILED DESCRIPTION OF INVENTION

The present invention resides in copolymers containing an alpha-olefin and an alpha, beta-ethylenically unsaturated carboxylic acid and their respective salts plasticized with a selected long-chain fatty acid, particularly copolymers of ethylene-acrylic acid and ethylene-methacrylic acid and their salts plasticized with selected long-chain fatty acids, as defined above, which impart certain desirable properties to said copolymers, such as higher melt index, greater flexibility, low stiffness, easier processability, higher resiliency and lower glass transition temperature (TG). The glass transition temperature as defined herein is the temperature at which an amorphous material, such as glass or a high polymer, changes from a brittle state to a plastic state.

Copolymers suitable for use in this invention preferably comprise an alpha-olefin having the general formula $RCH = CH_2$, wherein R is a radical selected from the group of hydrogen and alkyl radicals having from about 1 to about 8 carbon atoms, preferably from about 1 to about 4 carbon atoms, the olefin content of said copolymer being at least about 50 mol percent based on the total weight of the copolymer, preferably from about 50 to about 99.8 mol percent based on the total weight of the copolymer, and an alpha, beta-ethylenically unsaturated carboxylic acid having from about 3 to about 8 carbon atoms, preferably from about 3 to about 6 carbon atoms.

Examples of suitable alpha-olefins preferably are selected from the group of ethylene, propylene, butene-1, pentene-1, hexene-1, heptene-1, 3-methylbutene-1, 4-methylbutene-1 and the like, especially ethylene.

Examples of suitable alpha, beta-ethylenically unsaturated carboxylic acids include acrylic acid, methacrylic acid, ethacrylic acid, itaconic acid, maleic acid, fumaric acid and the like, especially acrylic acid and methacrylic acid.

The copolymers useful in the practice of this invention can be prepared in a conventional manner by bulk, solution or dispersant polymerization methods using known catalysts. Thus, the copolymers utilized by this invention can be prepared from the corresponding monomers with a diluent such as water in a heterogeneous system, usually referred to as emulsion or suspension polymerization, or with a solvent such as toluene, benzene, hexane, cyclohexane, acetone, ethyl acetate, butyl acetate, ethylene dichloride, or methyl isobutyl ketone in a homogeneous system, normally referred to as solution polymerization. Solution polymerization in benzene, toluene or a solvent having similar chain transfer activity is the preferred method used in forming the copolymers disclosed herein, because this method and solvent produce an especially preferred copolymer characterized by a relatively high molecular weight.

Copolymerization of the monomers disclosed herein readily takes place under the influence of heat, light and/or catalysts. Suitable catalysts include peroxide-type, free radical catalysts such as benzoyl peroxide, lauryl peroxide, or 5-butylhydroperoxide; and free radical catalysts such as $\alpha, \alpha'$-azodiisobutyronitrile. The catalysts, when used, are employed in concentrations ranging from about a few hundreds percent to about two percent by weight of the monomers. The preferred concentration is from about 0.2 to about 1.0 percent by weight of the monomers.

Copolymerization of the monomers disclosed herein takes place over a wide temperature range depending upon the particular monomers and catalysts utilized in the reaction. However, the copolymerization reaction is generally carried out at temperatures ranging from about 77° F (25° C) to about 302° F (105° C) when a catalyst such as $\alpha, \alpha'$-azodiisobutyronitrile is used. The copolymerization reaction is preferably carried out in an inert atmosphere, for example, nitrogen or carbon dioxide to favor the formation of copolymers having relatively high viscosities and molecular weights. Normally, a reaction time of from about 3 to about 72 hours is sufficient to complete the copolymerization process.

The copolymers disclosed herein have an average molecular weight of from about 20,000 to about 200,000, with a preferred molecular weight of from about 100,000 to about 200,000. The molecular weight of the copolymer can conveniently be determined using conventional techniques.

Another method for preparing the copolymers herein is disclosed in U.S. Pat. No. 3,557,070 issued to Anspon et al., entitled Preparation of Ethylene Polymers. The reference teaches a process for preparing ethylene-acrylic or ethylene-methacrylic acid copolymers by thermal cracking. In particular, an ethylene-isopropyl ester of acrylic or methacrylic acid is thermally decomposed in an inert atmosphere to produce an ethylene-acrylic acid-anhydride or an ethylene-methacrylic acid-anhydride, followed by conversion of the anhydride in a second thermal reaction step to produce an ethylene-acrylic acid or ethylene-methacrylic acid polymer. The disclosure set-forth in U.S. Pat. No. 3,557,070 is incorporated herein by reference.

The copolymers and their salts which are particularly suitable for use in the present invention, preferably are of high molecular weight which is defined by melt index, which is a measure of melt viscosity. The melt index of copolymers and their salts employed in this invention is preferably in the range of from about 0.1 to about 100 g/10 minutes, especially in the range of from about 0.5 to about 50 g/10 minutes. The method of obtaining the melt index of the copolymers herein is described in greater detail in ASTM:D-1238-57, the teaching of which is incorporated herein by reference.

It has been discovered that the plasticizers of the present invention are suitable for use to plasticize the ionomers (salts) of the above-described copolymers. The ionic copolymers are obtained by the reaction of the copolymer with an ionizable metal compound which is well known and referred to as neutralization. As such, the ionomers which are suitable for use in the invention are those in which at least 5 percent by weight, preferably from about 20 to about 100 percent by weight of the acid groups have been neutralized. Metal ions which are suitable for neutralizing the copolymers of the present invention are selected from monovalent, divalent and trivalent metals of Groups I, II, III, IV-A, and VIII of the Periodic Table of Elements. Specific examples of suitable monovalent metal ions are selected from $Na^+$, $K^+$, $Li^+$, $Cs^+$, $Rb^+$, $Hg^+$, and $Cu^+$. Examples of suitable divalent ions include $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$, and $Zn^{+2}$. Trivalent metal ions suitable for use herein are selected from the group of $Al^{+3}$, $Sc^{+3}$, $Fe^{+3}$, $Y^{+3}$.

The preferred metals suitable for neutralizing the copolymers used herein are the alkali metals of Group I, particularly cations such as Sodium, Lithium, Potassium, and alkaline earth metals of Group II, in particular, cations such as Calcium, Magnesium, and Zinc. It should be noted that more than one metal ion may be incorporated into the copolymer in certain applications.

A convient method of preparing the ionomers herein is disclosed in U.S. Pat. No. 3,437,718, issued to Rees, entitled Polymer Blends. In particular, the metal compound is added to an alpha-olefin/alpha, beta-ethylenically unsaturated carboxylic acid and the mixture is milled at a temperature of from about 140° to about 180° C for about 15 minutes or until the reaction proceeds to completion. The disclosure of U.S. Pat. No. 3,437,718 is incorporated herein by reference.

Another method of preparing the alkali metal salts of copolymers herein is disclosed in U.S. Pat. No. 3,970,626, issued to Hurst et al., on July 20, 1976; the disclosure of which is incorporated herein by reference. In particular, the reference teaches a hydrolysis process for preparing aqueous copolymer salt emulsions of alpha-olefin, alpha, beta-ethylenically unsaturated carboxylic acids by suspending a particular alpha-olefin, alpha beta-ethylenically unsaturated carboxylic acid ester interpolymer in water having an alkali metal dissolved therein and heating said mixture to a temperature of at least 180° C under autogenous pressure for a period of time sufficient to enable the alkali metal to react with a sufficient portion of the ester groups of the copolymer to render said copolymer emulsifiable in the aqueous alkali medium.

Examples of long chain fatty acids useful as plasticizers herein include saturated fatty acids selected from nonanoic acid (pelargonic acid) decanoic acid and undecanoic acid and unsaturated fatty acids selected from nonenoic acid, decenoic acid and 10-undecenoic acid. The amount of long-chain fatty acids that can be used varies over a wide range, but, in general can range from about 5 to about 50 weight percent based on the weight of the copolymer, preferably from about 20 to about 40 weight percent, based on the weight of the copolymer.

The plasticizers of this invention can be dispersed in the copolymer by any of the conventional methods and processes known in the art for dispersing conventional plasticizers. These methods and processes include dry blending, milling, kneading, Brabender mixing, plasticizing extrusion and the like. The method of dispersing the plasticizer in the copolymer is not critical and will depend to some extent on the copolymer and plasticizer used.

The temperature behavior of plasticized copolymers is a very important characteristic, because modern day applications, especially the military, may require not only that plastics made from plasticized copolymers be equally suitable for use in the Artic or in the Tropics; and additionally such copolymers utilized in aircraft may in a matter of minutes pass from high summer temperatures on the ground to subzero temperatures high in the air. Thus a highly desirable plasticized copolymer should possess uniform performance over a broad range of temperatures.

Comparisons based on copolymers containing equal volume or weight percentages of plasticizers are not dependable because of the great differences in plasticizing effectiveness among the various compounds. One convenient method of comparing plasticized compounds involves plotting second-order transition temperatures which are determined by plotting any temperature-dependent property of the specimen, such as density or refractive index against temperature. The transition temperature which is believed to be identified with the onset of rotational freedom within the copolymer macromolecules, is located by a sharp change of curvature. Since plasticizers lower this temperature by reducing inter-chain barriers against rotation, a comparison of second-order transition temperatures on copolymer-plasticizer compositions that are equivalent at room temperature affords a means of evaluating the temperature performance of plasticizers. The plasticized copolymers of the present invention have a second-order transition temperature below about 0° C. The second-order transition temperature herein is conviently defined as the copolymer glass transition temperature (TG), as determined using a model #900 DuPont Differential Scanning Caloremeter.

It should be noted that the plasticized copolymers suitable for use herein are especially suitable to bind safety glass, thus it is critical that the plasticized copolymer be substantially clear and free of discoloration which would render it opaque. Another critical feature of suitable plasticizers is the vapor pressure. Unfortunately, the use of lower chain fatty acids (i.e. 8 carbon atoms and lower) as plasticizers for alpha-olefin and alpha, beta-ethylenically unsaturated carboxylic acid copolymers are not acceptable because their vapor pressures are too high and would cause them to boil out during copolymer processing and impart a bad odor to the finished product. Thus plasticizers suitable for use are required to have a vapor pressure of less than 1 mm of Hg at 100° C.

It should additionally be noted that lauric acid ($C_{12}$-fatty acid) caproic acid ($C_6$-fatty acid) and octanoic acid ($C_8$-fatty acid) render alpha-olefin/alpha, beta-ethylenically unsaturated carboxylic acid copolymers either brittle, opaque or foul smelling when used as plasticizers, because it has been determined, that only the $C_9$ to $C_{11}$ saturated or unsaturated fatty acids work as plasticizers for the copolymers herein, when used in the context of a safety glass binder.

The following examples serve to demonstrate the best mode of how to practice the invention herein and should not be construed as a limitation thereof.

EXAMPLE I

A safety glass binder was prepared by mixing 30 grams of an ethylene-acrylic acid copolymer containing 6 mol percent acrylic acid and having a melt index of 0.5 g/10 min., with 10 grams of 10-undecenoic acid in a Brabender mixer at 190° C for 10 minutes. The finished product was removed and compression molded into 0.030 inch thick sheets. The plasticizer was substantially compatible with the copolymer with minimum surface bleeding and the finished product did not have a discernable odor. The plasticized copolymer was clear, had a melt index of 17.5 g/10 min. and a glass transition temperature of less than −10° C. Substantially the same results are obtained when an ethylene-methacrylic acid copolymer is substituted for the ethylene-acrylic acid copolymer above and when undecanoic acid is substituted for the 10-undecenoic acid above. This example is typical of those fatty acids which fall within the scope of the discovery herein.

EXAMPLE II

Twenty-Four grams of an ethylene-acrylic acid copolymer containing 6 mol percent acrylic acid and having a melt index of 0.5 g/10 min. were mixed with 16 grams of 10-undecenoic acid in a Brabender mixer at 190° C. for 10 minutes. The finished product was substantially compatible with the copolymer with only slight surface bleeding and did not have a discernable odor. The compound was substantially clear and had a melt index of 100 g/10 min. and a glass transition temperature of less than −40° C. Substantially the same results are obtained when ethylene-methacrylic acid is substituted for the ethylene-acrylic acid copolymer above. This example is typical of those fatty acids which fall within the scope of the discovery herein.

EXAMPLE III

Thirty grams of an ethylene-acrylic acid copolymer containing 6 mol percent acrylic acid and having a melt index of 0.5 g/10 min. were mixed with 10 grams of hexanoic acid (caproic acid) in a Brabender mixer at 190° C. for 10 minutes. The product was removed and compression molded into 0.030 inch thick sheets. The compound was not very compatible with the copolymer, there was excessive liquid present, a large amount of surface bleeding and the product gave off a very offensive odor. This example is representative of those fatty acids which do not plasticize alpha-olefin/alpha, beta-ethylenically unsaturated carboxylic acid copolymers.

EXAMPLE IV

Thirty grams of an ethylene-acrylic acid copolymer containing 6 mol percent acrylic acid and having a melt index of 0.5 g/10 min. were mixed with 10 grams of dodecanoic acid (lauric acid) in a Brabender mixer at 190° C. for 10 minutes. The product was removed and compression molded into 0.030 inch thick sheets. The lauric acid produced a gel when mixed with the above copolymer, there was no evidence of surface bleeding or an offensive odor. The finished product, however, was brittle and opaque, rendering it not suitable for use as a safety glass binder. This example demonstrates that lauric acid is not suitable for use as a plasticizer for the above copolymer in the context of a safety glass binder.

EXAMPLE V

Thirty grams of an ethylene-acrylic acid copolymer containing 6 mol percent acrylic acid and having a melt index of 0.5 g/10 min. were mixed with 10 grams of decanoic acid (capric acid) and allowed to stand overnight. The finished product was compression molded into a 0.030 inch sheet. The capric acid was compatible with the copolymer with no discernable surface bleeding. However, a moderate odor was present, the compound was substantially clear and had a melt index of 13.4 g/10 min., and the glass transition temperature was 0° C. Decenoic acid can be substituted for the decanoic acid above with substantially the same results.

EXAMPLE VI

Thirty grams of an ethylene-acrylic acid copolymer containing 6 mol percent acrylic acid and having a melt index of 0.5 g/10 min., were mixed with 10 grams of 10-undecenoic acid and allowed to stand overnight. The finished product was compression molded into a 0.030 inch sheet. The undecanoic acid was substantially compatible with the copolymer and did not have any surface bleeding and substantially no offensive odor was evident. The finished composition was substantially clear and had a melt index of 17.5 g/10 min., and a glass transition temperature of less than −10° C. Substantially the same results are obtained when ethylene-methacrylic acid is substituted for the ethylene-acrylic acid copolymer. This example is typical of those fatty acids which fall within the scope of the discovery herein.

EXAMPLE VII

Thirty grams of an ethylene-acrylic acid copolymer containing 6 mol percent acrylic acid and having a melt index of 0.5 g/10 min were mixed with 10 grams of nonanoic acid (pelargonic acid) and allowed to stand overnight. The finished product was compression molded into a 0.030 inch sheet. The nonanoic acid (pelargonic acid) was substantially compatible with the copolymer, there was indication of very slight surface bleeding, and only a moderate odor was present. The finished product was substantially clear, had a melt index of 15 g/10 min. and a glass transition temperature of about −40° C. When ethylene-methacrylic acid is substituted for the ethylene-acrylic acid above, substantially the same results occur. Nonenoic acid can be substituted for the pelargonic acid above with substantially the same results. This example is typical of those fatty acids which fall within the scope of the discovery herein.

The data obtained from analyzing the plasticized copolymers of Examples I to VII are set forth in greater detail in Table I below.

Table I

| Example | Compatibility | Surface Bleeding | Odor | Stiffness[1](PSI) | Optics[2] | Melt Index (q/10 min)[3] | Tg(° C)[4] |
|---------|---------------|------------------|------|-------------------|-----------|--------------------------|------------|
| Control[5] | — | — | — | 12,000 | 6 | 0.5 | +40 |
| I | good | none | none | To low to measure | 4 | 17.5 | −10 |
| II | good | slight | none | To low to measure | 4 | 100 | −40 |
| III | excessive liquid | large | offensive | — | — | — | — |
| IV | gel | none | none | brittle | opaque | 150 | +40 |
| V | good | none | moderate | To low to measure | 5 | 13.4 | 0 |
| VI | good | none | none | To low to measure | 4 | 17.5 | −10 |
| VII | good | slight | moderate | To low to measure | 6 | 15 | −40 |

[1]ASTM D-882-56T
[2]Blue haze based on scale of polyvinyl butryal = 1 and a 20% ethylene-methyl acrylate copolymer = 10
[3]ASTM D-1238-62T
[4]Glass transition temperature as determined by a model #900 DuPont Differential Scanning Caloremeter.
[5]An ethylene-acrylic acid copolymer containing 6 mol percent acrylic acid.

Obviously, many modifications and variations of the invention, as herein above set forth, can be made without departing from the spirit and scope thereof, and therefore only such limitations should be imposed as are indicated in the appended claims.

I claim:

1. A plasticized copolymer consisting essentially of at least about 50 mol percent of an alpha-olefin of the formula:

$$RCH = CH_2$$

wherein R is a radical selected from the group of hydrogen and alkyl radicals having from 1 to about 8 carbon atoms; and an alpha, beta-ethylenically unsaturated carboxylic acid having from about 3 to about 8 carbon atoms or the respective salts thereof; said copolymer having a molecular weight of from about 20,000 to about 200,000; and as a plasticizing agent from about 5 weight percent to about 50 weight percent, based on the weight of the copolymer of a long-chain fatty acid selected from saturated and unsaturated fatty acids containing 9 to 11 carbon atoms; said plasticized copolymer having a glass transition temperature below about 0° C.

2. The plasticized copolymer of claim 1 wherein the copolymer has a molecular weight range of from about 100,000 to about 200,000.

3. The plasticized copolymer of claim 1 wherein the alpha-olefin has from 2 to about 4 carbon atoms.

4. The plasticized copolymer of claim 1 wherein the alpha-olefin is selected from the group of ethylene, propylene, butene-1, pentene-1, hexene-1, heptene-1, 3-methylbutene-1 and 4-methylbutene-1.

5. The plasticized copolymer of claim 1 wherein the alpha-olefin is ethylene.

6. The plasticized copolymer of claim 1 wherein the alpha-olefin comprises from about 50 mole percent to about 99.8 mol percent of said copolymer.

7. The plasticized copolymer of claim 1 wherein the alpha, beta-ethylenically unsaturated carboxylic acid has from about 3 to about 6 carbon atoms.

8. The plasticized copolymer of claim 1 wherein the alpha, beta-ethylenically unsaturated carboxylic acid is selected from acrylic acid, methacrylic acid, ethacrylic acid, itaconic acid, maleic acid and fumaric acid.

9. The plasticized copolymer of claim 1 wherein the alpha, beta-ethylenically unsaturated carboxylic acid is acrylic acid.

10. The plasticized copolymer of claim 1 wherein the alpha, beta-ethylenically unsaturated carboxylic acid is methacrylic acid.

11. The plasticized copolymer of claim 1 wherein said copolymer contains a cation selected from sodium, lithium, potassium, calcium, magnesium, zinc and mixtures thereof.

12. The plasticized copolymer of claim 1 wherein at least about 5 weight percent of said alpha, beta-ethylenically unsaturated carboxylic acid groups have been neturalized with a cation.

13. The plasticized copolymer of claim 1 wherein from 20 weight percent to about 100 weight percent of said alpha, beta-ethylenically unsaturated carboxylic acid groups have been neutralized with a cation.

14. The plasticized copolymer of claim 1 wherein ssaid long-chain fatty acid is selected from nonanoic acid, decanoic acid, undecanoic acid, nonenoic acid, decanoic acid and 10-undecenoic acid.

15. The plasticized copolymer of claim 1 wherein said long-chain fatty acid is nonanoic acid.

16. The plasticized copolymer of claim 1 wherein said long-chain fatty acid is decanoic acid.

17. The plasticized copolymer of claim 1 wherein said long-chain fatty acid is undecanoic acid.

18. The plasticized copolymer of claim 11 wherein said long-chain fatty acid is nonenoic acid.

19. The plasticized copolymer of claim 1 wherein said long-chain fatty acid is decenoic acid.

20. The plasticized copolymer of claim 1 wherein said long-chain fatty acid is 10-undecenoic acid.

21. The plasticized copolymer of claim 1 wherein said long-chain fatty acid comprises from about 20 weight percent to about 40 weight percent based on the weight of the copolymer.

22. The plasticized copolymer of claim 1 wherein said long-chain fatty acid has a vapor pressure of less than 1 mm of Hg at 100° C.

* * * * *